(12) United States Patent
Groset et al.

(10) Patent No.: US 8,455,758 B2
(45) Date of Patent: Jun. 4, 2013

(54) CABLE ORGANIZATION ASSEMBLIES

(75) Inventors: Erik Groset, Carlsbad, CA (US); Justin Liu, San Diego, CA (US); Michael Klasco, Richmond, CA (US); Robin DeFay, Poway, CA (US)

(73) Assignee: Zipbuds, LLC, San Diego, CA (US)

( * ) Notice: Subject to any disclaimer, the term of this patent is extended or adjusted under 35 U.S.C. 154(b) by 138 days.

(21) Appl. No.: 12/941,943

(22) Filed: Nov. 8, 2010

(65) Prior Publication Data
US 2011/0162883 A1 Jul. 7, 2011

Related U.S. Application Data

(60) Provisional application No. 61/292,981, filed on Jan. 7, 2010.

(51) Int. Cl.
*H01B 11/06* (2006.01)
(52) U.S. Cl.
USPC ..................... 174/36; 174/DIG. 11
(58) Field of Classification Search
USPC ............... 174/110 R, 115, 116, 117 R, 117 F, 174/117 FF, 114 S, 112, 36
See application file for complete search history.

(56) References Cited

U.S. PATENT DOCUMENTS

| | | | |
|---|---|---|---|
| 2,313,234 A * | 3/1943 | Gavitt | 174/120 SR |
| 2,585,054 A * | 2/1952 | Stachura | 174/36 |
| 2,896,217 A | 7/1959 | Cedarstaff | |
| D203,677 S | 2/1966 | Spilman et al. | |
| 3,272,926 A | 9/1966 | Falkenberg et al. | |
| 3,441,951 A | 4/1969 | Lee et al. | |
| 3,454,964 A | 7/1969 | Brinkhoff et al. | |
| 3,505,684 A | 4/1970 | Hutchinson et al. | |
| D228,352 S | 9/1973 | Itagaki et al. | |
| D231,613 S | 5/1974 | Sarber | |
| 3,810,525 A | 5/1974 | Crenna | |
| 4,160,306 A | 7/1979 | Pizzoccaro | |
| D270,634 S | 9/1983 | Ungar | |
| 4,409,442 A | 10/1983 | Kamimura | |
| 4,588,868 A | 5/1986 | Bertagna et al. | |

(Continued)

FOREIGN PATENT DOCUMENTS

| CN | 201528413 U | 7/2010 |
|---|---|---|
| CN | 2022261737 U | 5/2012 |

(Continued)

OTHER PUBLICATIONS

"Zip up your headphones", retrieved from the Internet on Mar. 20, 2012, <http://old.thepostfamily.com/community_posts/567-zip-up-your-headphones>.

(Continued)

*Primary Examiner* — William H Mayo, III
(74) *Attorney, Agent, or Firm* — Mintz Levin Cohn Ferris Glovsky and Popeo, P.C.

(57) ABSTRACT

Preferred assemblies are directed to a cable assembly that includes a first electrical wire and a second electrical wire; with a thermo-resistant material that is molded around the wires. Zipper teeth are molded to the thermo-resistant material of both of the wires. The zipper teeth on the first wire are releasably attached to the zipper teeth on the second wire, and at least one reinforcing fiber is encapsulated with one of the wires.

19 Claims, 14 Drawing Sheets

U.S. PATENT DOCUMENTS

| | | | |
|---|---|---|---|
| 4,802,638 A | 2/1989 | Burger et al. | |
| D301,145 S | 5/1989 | Besasie et al. | |
| 4,829,571 A | 5/1989 | Kakiuchi et al. | |
| D328,461 S | 8/1992 | Daido et al. | |
| D337,115 S | 7/1993 | Yamazaki et al. | |
| 5,357,049 A * | 10/1994 | Plummer, III | 174/36 |
| D353,817 S | 12/1994 | Wada | |
| D353,818 S | 12/1994 | Nakamura | |
| 5,391,838 A * | 2/1995 | Plummer, III | 174/36 |
| 5,406,037 A | 4/1995 | Nageno et al. | |
| 5,406,837 A | 4/1995 | Britt | |
| 5,449,026 A * | 9/1995 | Lee | 139/383 A |
| D391,573 S | 3/1998 | Nakamura | |
| 5,757,929 A * | 5/1998 | Wang et al. | 381/300 |
| 5,861,579 A * | 1/1999 | Bickersteth et al. | 174/136 |
| 5,906,507 A | 5/1999 | Howard | |
| 5,949,026 A | 9/1999 | DeFlorio | |
| 5,958,315 A | 9/1999 | Fatato et al. | |
| 6,006,115 A | 12/1999 | Wingate | |
| D420,356 S | 2/2000 | Suzuki | |
| D430,140 S | 8/2000 | Roman | |
| D431,550 S | 10/2000 | Yoneda | |
| 6,137,675 A * | 10/2000 | Perkins | 361/679.03 |
| 6,324,053 B1 * | 11/2001 | Kamijo | 361/679.03 |
| 6,374,126 B1 | 4/2002 | MacDonald, Jr. et al. | |
| 6,480,611 B2 | 11/2002 | Hashimoto et al. | |
| 6,507,486 B2 * | 1/2003 | Peterson, III | 361/679.03 |
| D469,753 S | 2/2003 | Andre et al. | |
| D476,639 S | 7/2003 | Bergeron et al. | |
| D491,163 S | 6/2004 | Green | |
| 6,826,782 B2 | 12/2004 | Jordan | |
| 6,909,050 B1 * | 6/2005 | Bradford | 174/110 R |
| 6,946,047 B2 | 9/2005 | Cao | |
| D514,087 S | 1/2006 | Wilson et al. | |
| 7,077,693 B1 | 7/2006 | Symons | |
| 7,174,196 B2 | 2/2007 | Matsuda | |
| D538,261 S | 3/2007 | Taylor et al. | |
| D541,255 S | 4/2007 | Taylor et al. | |
| D546,321 S | 7/2007 | Kim | |
| D549,688 S | 8/2007 | Suzuki | |
| D549,847 S | 8/2007 | Sutton | |
| 7,256,347 B2 | 8/2007 | Gustavsson | |
| D569,841 S | 5/2008 | Chung et al. | |
| D573,581 S | 7/2008 | Gondo et al. | |
| D573,851 S | 7/2008 | Huynh | |
| D578,507 S | 10/2008 | Ando | |
| D581,394 S | 11/2008 | Lee | |
| 7,450,014 B2 | 11/2008 | Farhadian | |
| D585,871 S | 2/2009 | Lee | |
| D585,872 S | 2/2009 | Lee | |
| D588,098 S | 3/2009 | Kurihara | |
| D589,491 S | 3/2009 | Andre et al. | |
| 7,498,510 B2 * | 3/2009 | Chen et al. | 174/36 |
| D591,264 S | 4/2009 | Hong et al. | |
| D594,847 S | 6/2009 | Suzuki | |
| D596,690 S | 7/2009 | Bennett | |
| D598,010 S | 8/2009 | Matsuda et al. | |
| D599,778 S | 9/2009 | Ando | |
| D603,370 S | 11/2009 | Suzuki | |
| D605,628 S | 12/2009 | Ando | |
| D607,875 S | 1/2010 | Pedersen, II | |
| D614,168 S | 4/2010 | Rogers et al. | |
| D637,756 S | 5/2011 | Okano et al. | |
| D637,999 S | 5/2011 | Brunner et al. | |
| D639,775 S | 6/2011 | Horibe et al. | |
| D642,554 S | 8/2011 | Schaal et al. | |
| D643,414 S | 8/2011 | Lee et al. | |
| D649,956 S | 12/2011 | Gresko et al. | |
| D652,407 S | 1/2012 | Groset et al. | |
| 8,107,653 B2 | 1/2012 | Wolfe | |
| 8,147,270 B1 | 4/2012 | Wescott | |
| D662,080 S | 6/2012 | Carr et al. | |
| 8,269,110 B2 | 9/2012 | Scifo et al. | |
| 8,269,111 B2 | 9/2012 | Scifo et al. | |
| 2005/0069147 A1 * | 3/2005 | Pedersen | 381/74 |
| 2005/0098594 A1 | 5/2005 | Truong | |
| 2005/0123164 A1 | 6/2005 | Yao et al. | |
| 2006/0166720 A1 | 7/2006 | Dixon | |
| 2006/0185873 A1 | 8/2006 | Johnson | |
| 2007/0081690 A1 | 4/2007 | Stagni et al. | |
| 2008/0099229 A1 * | 5/2008 | Scifo et al. | 174/117 R |
| 2011/0162883 A1 | 7/2011 | Groset et al. | |

FOREIGN PATENT DOCUMENTS

| | | | |
|---|---|---|---|
| EP | 1509062 A1 | 2/2005 | |
| JP | 07-115022 A | 5/1995 | |
| JP | 2004056636 A | 2/2004 | |
| JP | 2004-211225 A | 7/2004 | |
| JP | 2006-527934 A | 12/2006 | |
| JP | 3132983 U | 6/2007 | |
| WO | WO 2004/112359 | 12/2004 | |
| WO | WO-2009030578 A1 | 3/2009 | |

OTHER PUBLICATIONS

"Yi Zip Earphones by Ji Woong", retrieved from the Internet on Mar. 20, 2012, <http://www.yankodesign.com/2009/04/22/zip-up-tangles/>.

"Yi Sound Concept Brings the Hot Jean-Crotch Aesthetic to Earbuds", retrieved from the Internet on Jul. 5, 2012, <http://gizmodo.com/zipper-earbuds/>.

International Search Report and Written Opinion dated Mar. 28, 2012, for corresponding PCT Application No. PCT/US2011/059637.

Notice of Reasons for Rejection dated Nov. 2, 2012, for Japanese Patent Application No. 2011-241549.

* cited by examiner

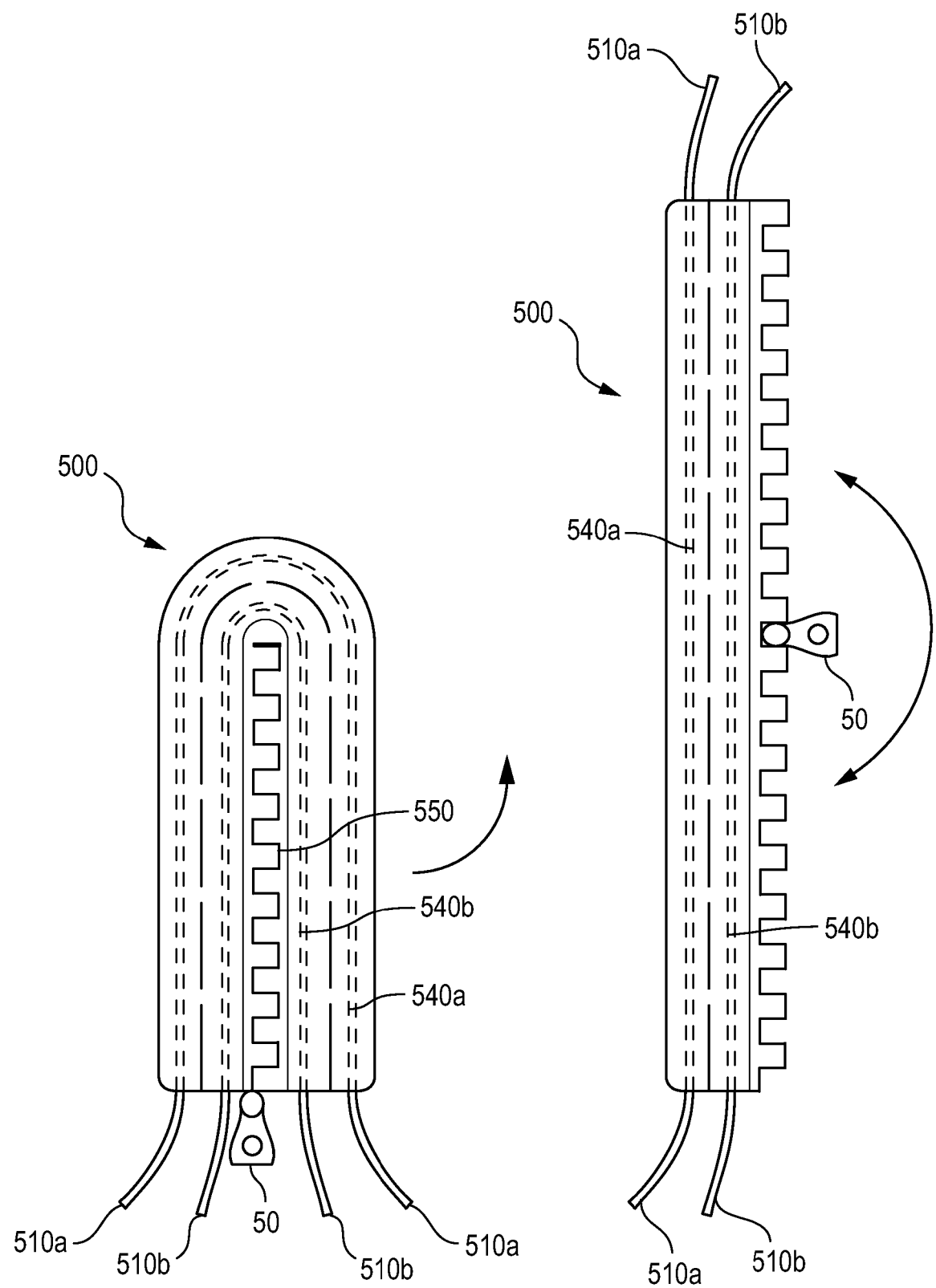
*Fig. 6a*  *Fig. 6b*

CABLE ORGANIZATION ASSEMBLIES

CROSS-REFERENCE TO RELATED APPLICATIONS

This application claims priority to pending Provisional Application No. 61/292,981 "Cable Organization Assemblies" to Groset, filed Jan. 7, 2010, which is expressly incorporated by reference herein in its entirety.

FIELD OF THE INVENTION

The embodiments herein relate to assemblies that are configured to prevent cables from becoming entangled with each other. More specific embodiments relate to two or more cables that are configured to be releasably coupled to one another. Embodiments herein can be used to prevent entanglement of audio wires, such as headphone wires and stereo speaker wires, in addition to other suitable cables.

BACKGROUND

Multiple electronic devices are designed to be used with a plurality of connecting wires and cables. Common examples include audio or video players that have a headphone jack, or have ports for speaker wires. A common problem for users is that these cables often become entangled with each other. For example, left and right headphone wires readily become intertwined and knotted, especially in ear bud style headphones. Additionally, stereo speaker wires usually are configured in pairs and can also become entangled with themselves or other wires.

There have been prior attempts to resolve this issue. European Patent Application 1509062 A1 to Fung (hereinafter "Fung") discloses a sliding mechanism that is integrated directly into the cables, see FIGS. 2a-2c and Paragraph [0006]. More specifically Fung is directed to engagement means that can be molded together with the insulation layer of the cords. In practice this strategy is limiting in that it makes it difficult to incorporate different styles, types, and colors of releasable fasteners. While mentioning the incorporation of zipper like arrangements on the two cords, Fung is silent as to how to do this in an advantageous way. The practical implementation of zippered cables assemblies involves overcoming many manufacturing problems, none of which are addressed by Fung. For example, the manufacture of zippered cables involves elevated temperature and stress during fabrication. Accordingly, there is a need for improved cable management systems and methods of making the same. Materials and fabrication techniques are disclosed herein to overcome these problems.

It is thus one embodiment herein to provide cable assemblies that include means for preventing entanglement and easily allow the incorporation of a zipper or other releasable connection means to the cables.

SUMMARY

According to preferred embodiments, the teachings herein are directed to cable assemblies comprising a first and second wire individually encapsulated in an outer layer comprising a thermo-resistant material, wherein the first and second outer layers each comprise means for releasably attaching with each other.

Further embodiments are directed to methods of making cable assemblies comprising: (a) providing a first and second wire individually encapsulated in an outer layer comprising a thermo-resistant material; and (b) affixing means for releasable attachment on the outer layers of the first and second wires, such that the outer layers can releasably attach with one another.

BRIEF DESCRIPTION OF THE DRAWINGS

It will be appreciated that the drawings are not necessarily to scale, with emphasis instead being placed on illustrating the various aspects and features of embodiments of the invention, in which:

FIG. 6a is a closed cable assembly that can open to twice its compressed length.

FIG. 6b is an opened cable assembly that is expanded to two times the length of its closed configuration.

DETAILED DESCRIPTION OF THE ILLUSTRATED EMBODIMENTS

Embodiments of the present invention are described below with reference to the above described Figures. It is, however, expressly noted that the present invention is not limited to the embodiments depicted in the Figures, but rather the intention is that modifications that are apparent to the person skilled in the art and equivalents thereof are also included. In general embodiments the assemblies herein include at least two cables (80a, 80b) that are capable of releasable attachment. Further embodiments can also manage 3, 4, 5, 6, 7, 8, 9, 10 or more cables.

Earphone Cable Assemblies

Figure 1:
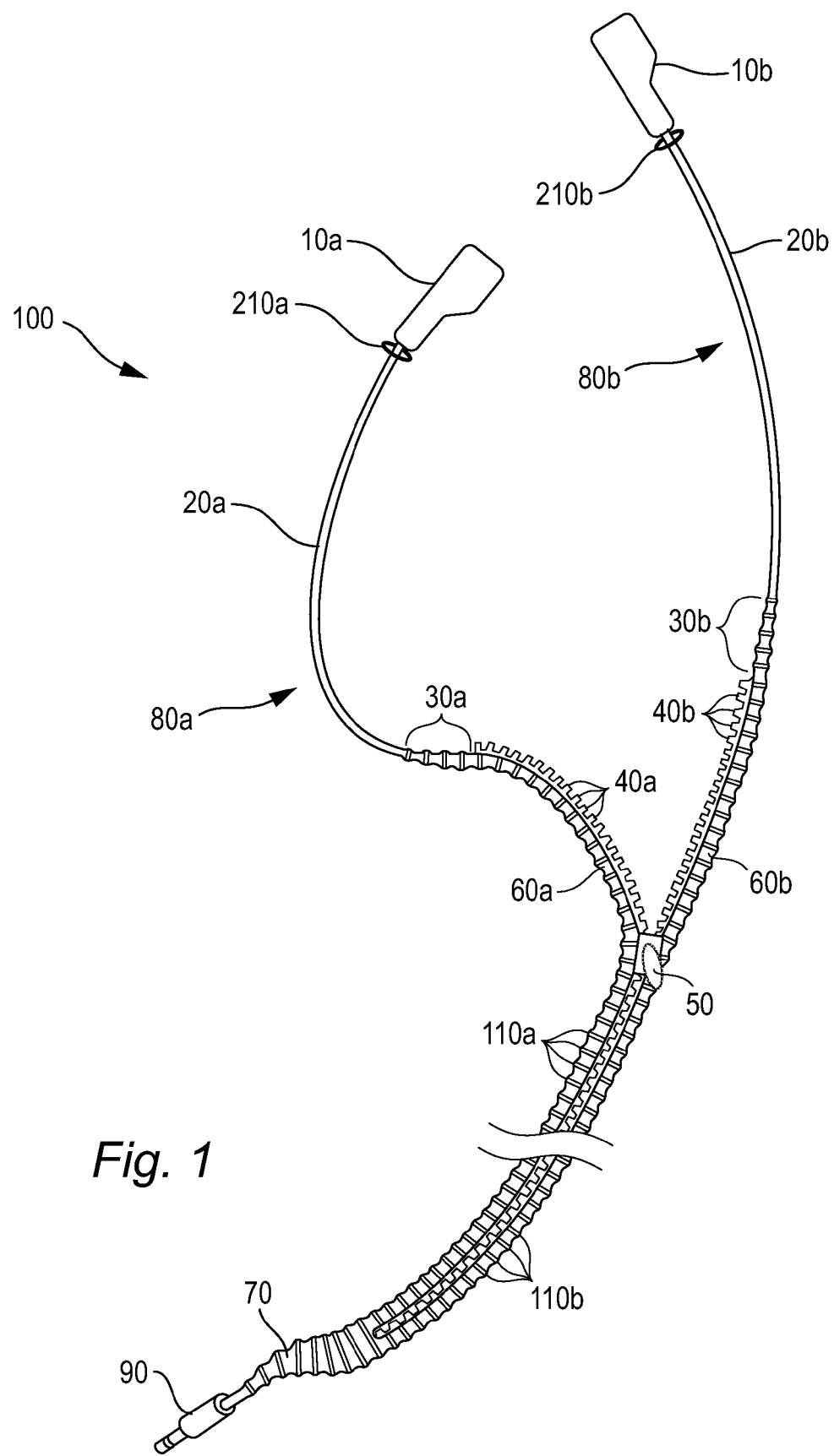
FIG. 1 is a perspective view of a first zipper earphone cable assembly.
Figure 2:
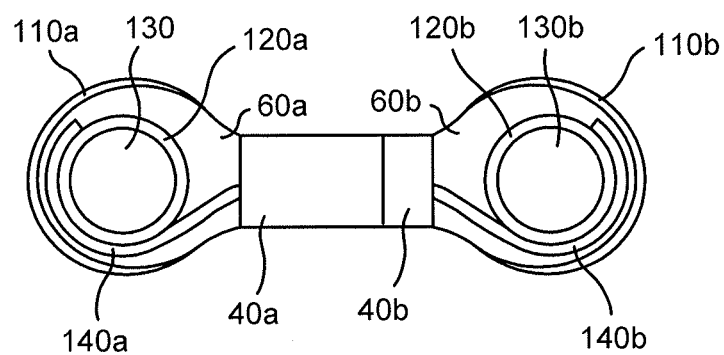
FIG. 2 is a cross-section view of two cables in a first zipper earphone cable assembly.

FIGS. 1-2 depict a first preferred zipper earphone cable assembly 100 comprising first and second cables 80a and 80b that include means for releasable attachment with one another. Each cable 80a and 80b can be operably coupled to an earphone 10a and 10b at a first end and a headphone jack 90 suitable for connection to an audio playing device at the other. The head phone jack can be any suitable jack including a 6.35 mm jack, 3.5 mm miniature jack, or a 2.5 mm subminiature jack, for example.

More specifically, the two cables 80a and 80b each can include an outer layer or over-mold 60a and 60b that is made of rubber or other flexible material which can be incorporated using any suitable method including cast or injection molding, for example. The over-mold 60a and 60b makes it simpler for manufacturing the assemblies herein as it can easily encapsulate the wires. Other suitable flexible materials for the over-mold can include fabric, plastic, and foam. As shown in cross-sectional view of FIG. 2, the outer layering 60a and 60b can be layered over the headphone wire 130a and 130b and the headphone wire casing 120a and 120b. The headphone wires 130a and 130b operably couple a jack 90 to the earphones 10a and 10b such that audio can be transmitted. A majority, but not the entire length of the cables 80a and 80b can include means for releasable attachment together, such as a zipper. As depicted in FIG. 1, the cables 80a and 80b are coupled to inward facing complementary zipper teeth 40a and 40b that allow the cables 80a and 80b to be zipped together and unzipped using a zipper tab 50 or other means for sliding. Alternatively a ZIPLOC® style or other similar closure can be used.

According to certain embodiments, such as when a zipper is utilized, it is preferred that the means for releasable attachment do not traverse the entire length of the cables 80a and 80b as measured from the stop 70 or jack 90 to the earphones 10a and 10b. Partial traversal prevents the zipper teeth 40a and 40b from painfully contacting or pinching the user's face or neck. To prevent this hazard, the assembly 100 can include a non-teethed section 20a and 20b. Alternatively, the over-mold can simply end before the earphones 10a and 10b (such as at sections 30a and 30b) and the headphone wire casing 120a and 120b can simply be exposed for a portion of their length.

In optional embodiments, the outer layer 60a and 60b can include ribs 110a and 110b. Ribs 110a and 110b which provide protrusions and recessions along the length of the outer molding 60a and 60b can be used to achieve better flexibility and weight reduction. In general, the ribbing 110a and 110b removes material which reduces weight from the overmold 60a and 60b and allows for better manipulation of the assembly 100.

The cables 80a and 80b can include non-ribbed sections without means for releasable connection (e.g., zippers) 20a and 20b and ribbed sections 30a and 30b that lack means for releasable attachment, depending on the specific design goals. According to further embodiments the material that constitutes the outer layer 60a and 60b can be used for non-teethed sections 20a and 20b and the stop 70.

The bottom end of the zipper can include a means for stopping the zipper so the cables 80a and 80b do not become completely disengaged. As shown in FIG. 1, molded material that is the same as that of 60a and 60b can be used as a stop 70, and can be tapered downward towards the plug 90, or be in another suitable configuration. Other suitable stops are readily contemplated herein.

FIG. 2 depicts a cross-sectional view the zipper assembly 100 shown in FIG. 1. As shown both the headphone wires 130a and 130b and their casings 120a and 120b can be encapsulated by the over-mold material 60a and 60b. According to certain embodiments, such as when a zipper is used, flexible zipper backing material 140a and 140b can be wrapped around the headphone wire casings 120a and 120b and also be encapsulated by the over-mold material 60a and 60b. The zipper backing material 140a and 140b can be made of any suitable, flexible material such as fabric, including AQUA-GUARD® manufactured by YKK®. Encapsulating the wires 130a and 130b, their casings 120a and 120b, and the zipper backing material 40a and 40b in the over-mold material 60a and 60b in a single process efficiently minimizes manufacturing steps.

For manufacturing the assembly 100 a mold can be configured to encapsulate the headphone wires 130a and 130b up to the earphones 10a and 10b if desired. Alternatively, the mold can be configured such that the over-mold ends before the earphones 10a and 10b and the headphone wire casing 120a and 120b can simply be exposed for a portion of their length. The zipper backing material 140a and 140b can then be wrapped around the headphone wire casings 120a and 120b and placed into the mold. Rubber, or other suitable materials can be added to the mold and allowed to harden to form the final assembly.

Figure 3:
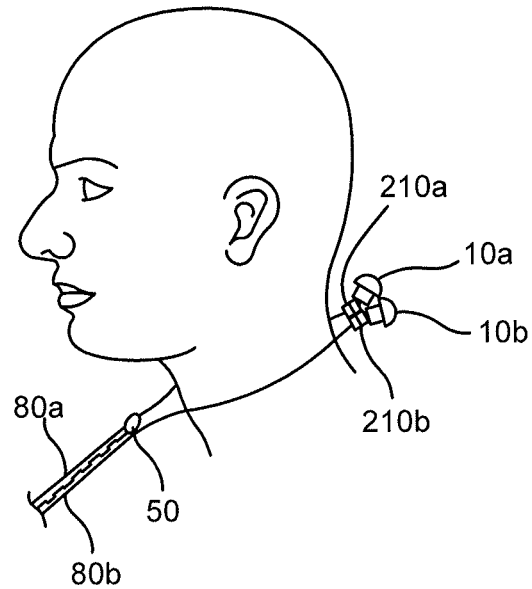
FIG. 3 is perspective view showing a zipper earphone cable assembly in use.

As the releasable attachment means described herein add additional weight to headphone wires 20a and 20b by themselves, further embodiments include the use of means to prevent the earphones 10a and 10b from falling downward quickly when taken out of a user's ears. Complementary oppositely charged magnets 210a and 210b, or other means for releasable attachment can be used either on or near the earphones 10a and 10b, such as in the non-teethed region 20a and 20b, for example. As shown in FIG. 3, when a user removes the earphones 10a and 10b from their ears they can connect the earphones 10a and 10b (or cables 80a and 80b) together behind their neck using the magnets 210a and 210b or means for releasable attachment, such as a clips, snaps, hook and loop fasteners, and the like. An ear hook or similar device can also be provided with the different embodiments herein to assure stability of the earphone in conditions such as sports activities.

Figure 4:
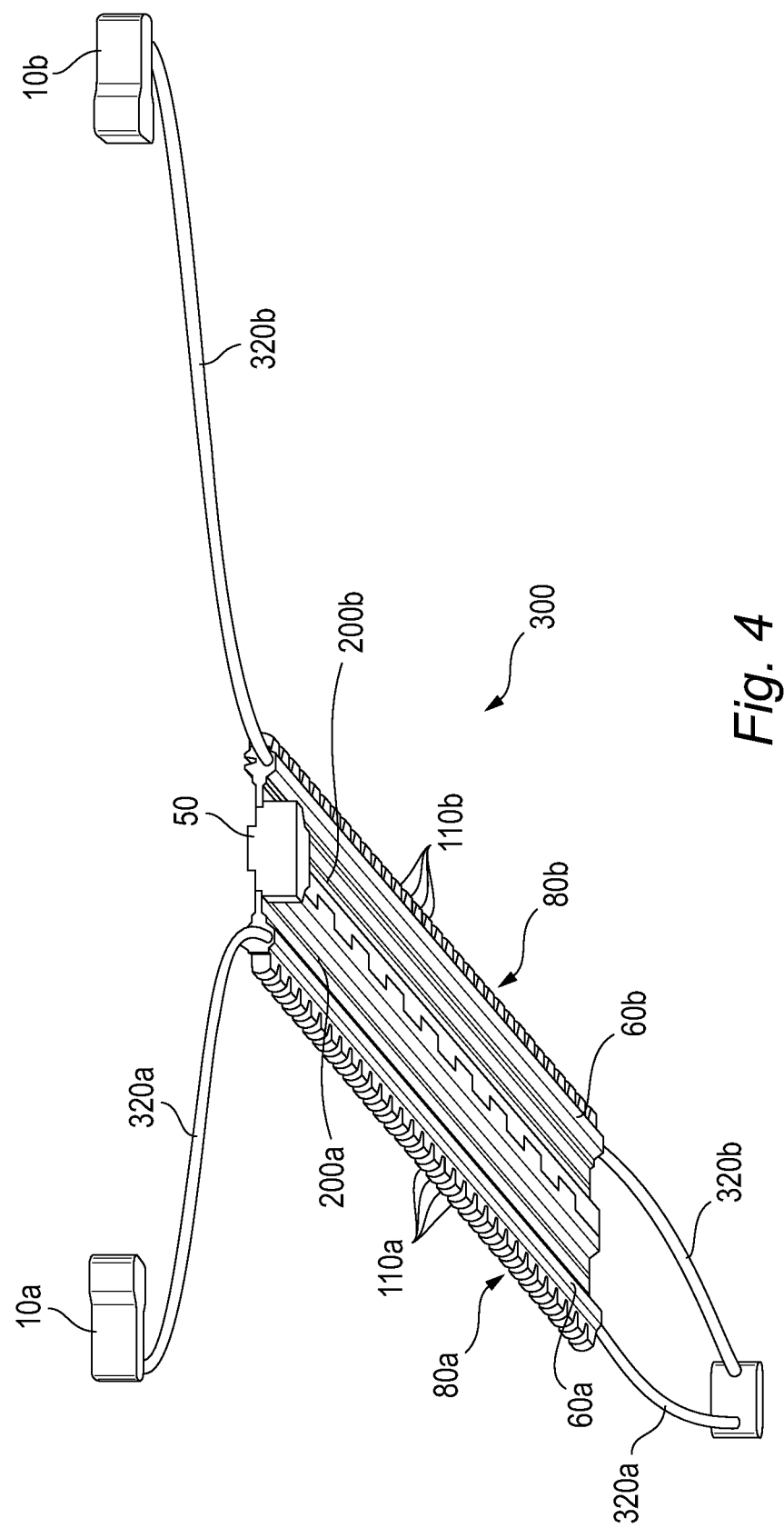
FIG. 4 is a perspective view of a second alternative zipper earphone cable assembly.
Figure 5:
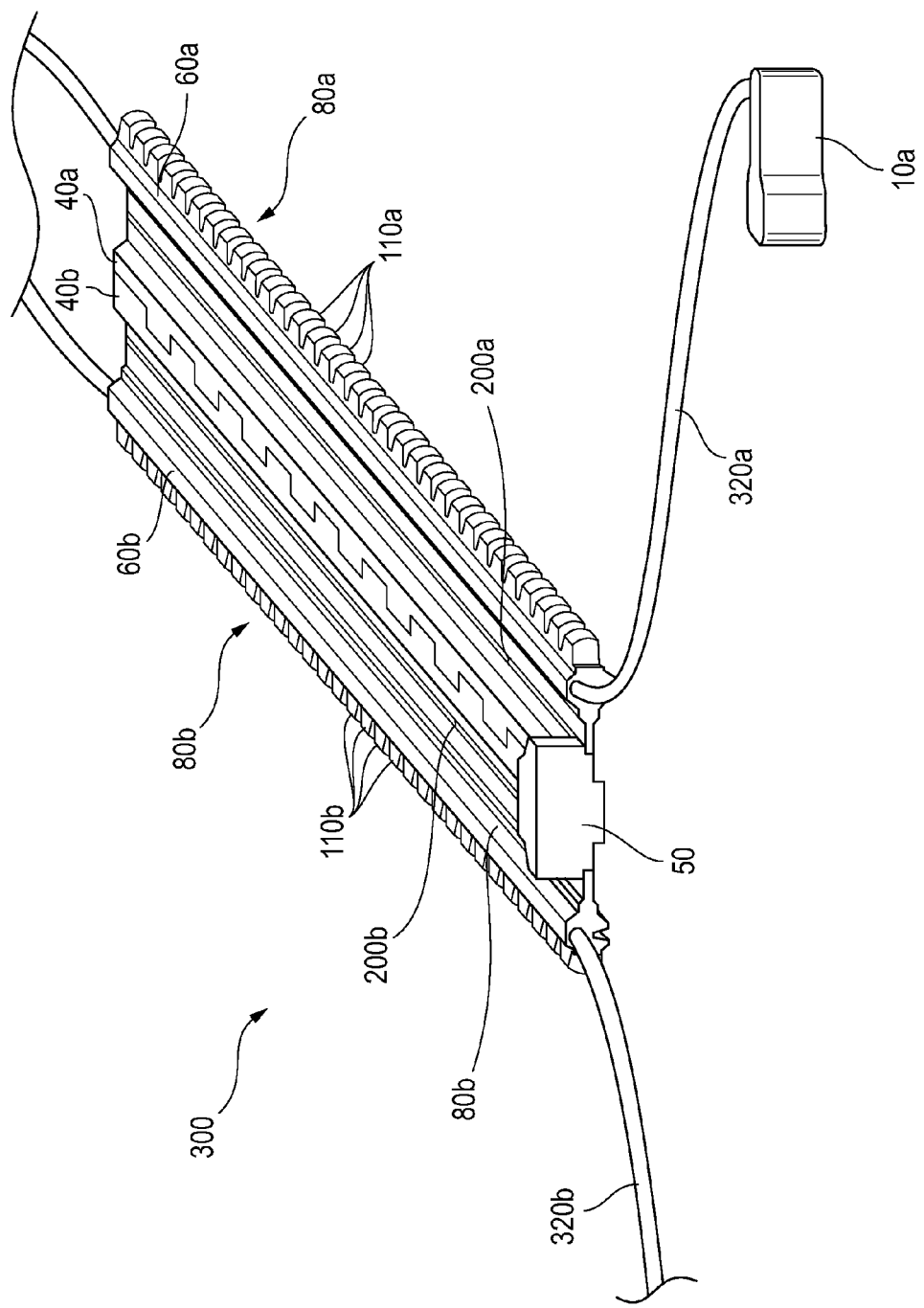
FIG. 5 is a close-up view of a second alternative zipper earphone cable assembly.

FIGS. 4 and 5 show a second alternative zipper earphone cable assembly 300. This particular design differs from the first zippered earphone assembly 100 described above in that the over-mold material 60a and 60b only partially covers the first and second earphone wires 320a and 320b. Features between the previously described assembly and the alternative assembly 300 can readily be interchanged as desired however. A first and second earphone wire 320a and 320b are partially molded into an over-mold material 60a and 60b. Each cable 80a and 80b includes zipper teeth 40a and 40b or other suitable means for releasable attachment with each other. A zipper tab or slider 50 or other means for opening and closing the means for releasable attachment is also provided. Each cable 80a and 80b optionally includes ribs 110a and 110b to allow for more flexible movement and reduced weight. Additionally two troughs 200a and 200b can traverse parallel or substantially so to the means for releasable attachment (e.g., zipper 40a and 40b). In addition to a zipper other suitable means for attachment can include small magnets, or a ZIPLOC® style closure, for example. Certain embodiments expressly exclude the use of rough hook and loop fasteners such as VELCRO® with the assemblies provided herein as they can be abrasive on a user's skin. The mold for making the assembly 300 depicted in FIGS. 5 and 6 could be configured to not cover the entire length of the earphone wires 320a and 320b, but can have the same or similar cross-section shown in FIG. 2. Accordingly, methods of making the assembly discussed in FIGS. 1 and 2 can be applied to this particular embodiment as well.

Figure 9:
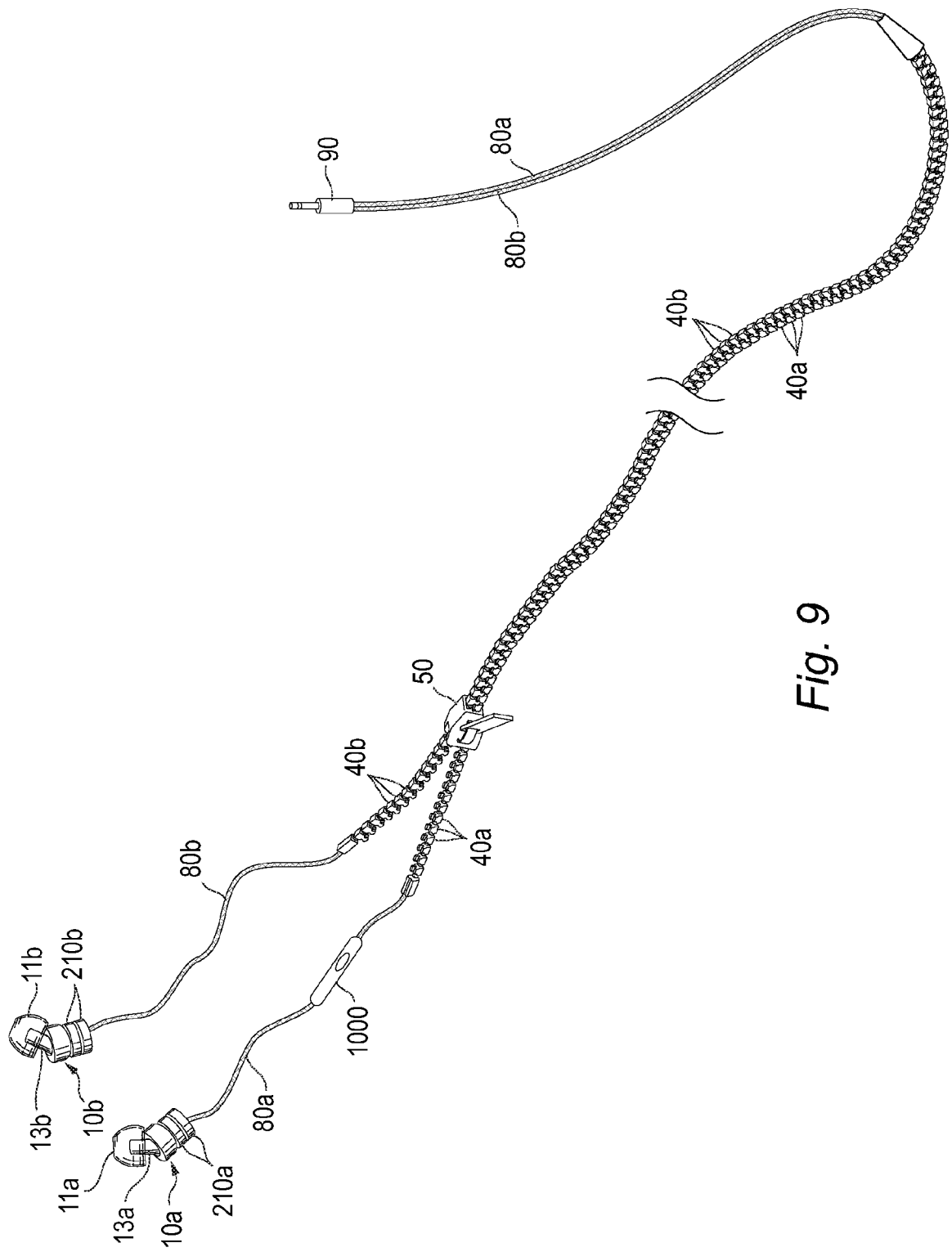
FIG. 9 is a perspective view of a third zipper earphone cable assembly.
Figure 10:
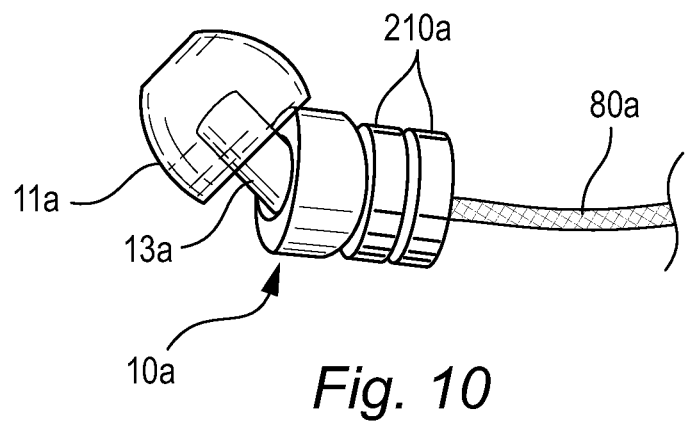
FIG. 10 is a preferred ear bud of the zipper earphone cable assemblies.
Figure 11:
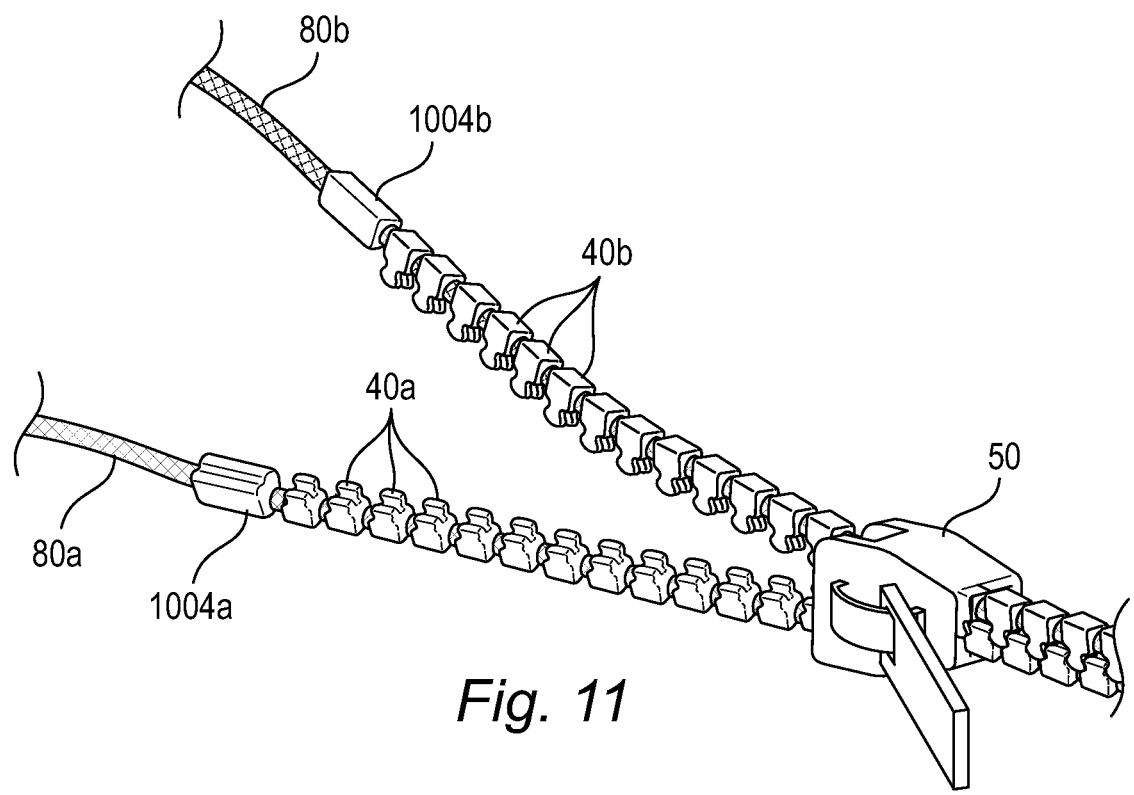
FIG. 11 is a close up view of a third zipper earphone cable assembly.

A third embodiment of a zipper earphone cable assembly 700 is shown in FIGS. 9-11. In contrast to the first 100 and second 300 zipper cable assembly embodiments, this embodiment expressly does not have an over-mold 60a and 60b in its finished form. In contrast, complementary zipper teeth 40a and 40b, configured to operably zip together and apart with a slider 50, are positioned directly onto the cables 80a and 80b as shown in FIG. 11. Similar to the above embodiments, the third embodiment of a zipper earphone cable assembly 700 includes two headphones such as ear buds 10a and 10b operably coupled to a lower jack 90.

FIG. 10 depicts a preferred ear bud 10a. According to specific embodiments, the ear bud 10a can include a diaphragm 11a made of a thin material and coupled to an angled extension 13a configured to fit within a user's ear and transmit sound therein. The extensions 13a and 13b are preferably angled towards the user's ears during wear and are advantageous in that they help prevent the buds 10a and 10b from falling out of the user's ear due to the extra weight the zipper teeth 40a and 40b and slider 50 add to the cables 80a and 80b compared to conventional headphones. Complementary oppositely charged magnets 210a and 210b, or other means for releasable attachment can be used either on or near the earphones 10a and 10b. As shown in FIG. 3, when a user removes the earphones 10a and 10b from their ears they can connect the earphones 10a and 10b (or cables 80a and 80b) together behind their neck using the magnets 210a and 210b or means for releasable attachment, such as a clips, snaps, hook and loop fasteners, and the like. In addition to the preferred ear buds 10a and 10b provided herein, other suitable ear phones, including conventional ear buds can be used with the teachings herein according to non-preferred embodiments.

The assemblies herein, including the third earphone zipper embodiment 700 can optionally include a volume control 1000 positioned on the first cable 80a above the zipper teeth 40a. The volume control 1000 is operably coupled to the internal wiring of the cable 80a and includes an external control mechanism accessible by the user configured to increase/decrease volume and/or completely mute volume such that no significant audio signal is transmitted to the ear buds 10a and 10b. The volume control 1000 can also be positioned on the second cable 80b.

FIGS. 12-18 depict a preferred way of manufacturing the third embodiment of a zipper earphone cable assembly 700 using plastic injection molding. Injection molding is a well known process that utilizes a thermoplastic and thermosetting plastic materials. In general, material is fed into a heated barrel, mixed, and forced into a mold cavity where it cools and hardens to the configuration of the mold cavity. Preferably the zipper teeth 40a and 40b provided herein are made of a thermoplastic material. In general, thermoplastic material that can be used herein include polymers that are in a liquid state when heated and harden into a solid state after cooling down. Non-exclusive examples include: polyacetal, polyethylene and polypropylene. Advantageously, self lubricating plastics such as polyacetal (POM) and polypropylene (PP) are preferred for snag-free zipper operation. Polyacetal is also a preferred choice for its strength and wide temperature tolerance.

Figure 12:
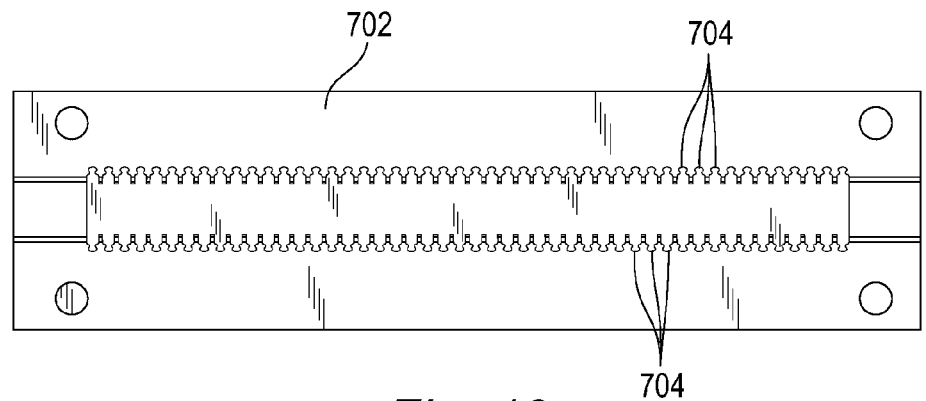
FIG. 12 is a topside view of two earphone cables being placed in a mold.

As shown in FIG. 12, first and second cables 80a and 80b are positioned into a mold 702 having cavities 704a and 704b in the shape of the final zipper teeth 40a and 40b. The cables 80a and 80b are preferably held or clamped at a tension taught enough to allow injection molded plastic to bind to them according to a predetermined spacing but not overly taught such that the internal wires or the outer covering of the cables 80a and 80b break apart or are otherwise damaged. Preferred tension ranges for holding the cables 80a and 80b during injection molding include about 10 kg of back tension. It is advantageous to hold the cables 80a and 80b straight or substantially so, during over-molding but not with too much tension such that the cables 80a and 80b are overly stressed or damaged. Attaching the zipper teeth provides severe thermal stress due to the high temperature associated with the injection molding process and the tensile strength of the cables 80a and 80b is reduced at elevated temperatures. In the case of some thermoplastics such as polyacetal (POM) (including DELRAN brand polyacetal) the injection molding temperature can be heated to about 200° C. Positioning the plastic through the tooling additionally subjects the cables 80a and 80b to extreme stresses as they are often clamped and pulled taught. Due to the high temperature and mechanical stresses on the cables 80a and 80b it is highly advantageous to utilize reinforcement fibers, calibrated precision tensioning, and high temperature tolerance cable insulation materials with the teachings herein. These materials and properties not only are useful to overcome the stresses of manufacturing but also contribute to a more durable final cable assembly for use by a consumer.

Figure 19:
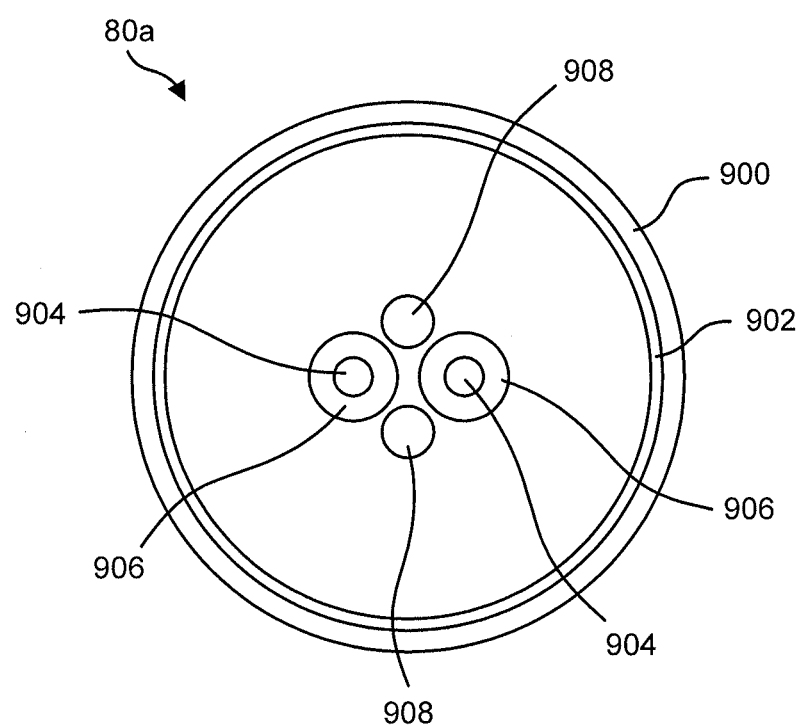
FIG. 19 is a cross-sectional view of cable in a third zipper earphone cable assembly.

FIG. 19 provides a cross-section view of a preferred cable 80a (also applicable for 80b) usable with the teachings herein that show both the internal wiring and the outer covering. According to preferred embodiments, the cables 80a and 80b comprise an outer surface 900 such as braided nylon, and more specifically can be in the form of draw textured yarn (DTY) that is heat resistant. The use of braided nylon as an outer covering is advantageous in that it is elastic and thermal-resistant to the heat associated with injection molding. Additionally the texture of the braided nylon allows the zipper teeth 40a and 40b to attach better as opposed to a smooth cable outer surface such as rubber. The average thicknesses for the outer layer 900 is preferred to be about 0.15 mm. The outside diameter of the outer layer 900 can be between 1.35 mm and 1.65 mm, or more specifically 1.5 mm, or 1.35 mm-1.4 mm.

An inner layer 902 can also be used, preferably a material having elastic properties such as a thermoplastic elastomer (TPE) and more specifically an extruded TPE, which include copolymers or a physical mix of polymers (usually a plastic and a rubber) which consists of materials with both thermoplastic and elastomeric properties. Reinforcement fibers 908 can also be used to add strength to the cables 80a and 80b as fabrication and function can involve higher pull strength than conventional earphone cables. Preferred materials include aramids such as Kevlar, and more specifically 200D-400D Kevlar including, 200D Kevlar, 300D Kevlar, and 400D Kevlar. Audio wires 904 configured to transmit sound from the jack 90 to the earbuds 10a and 10b can be positioned within the cables 80a and 80b. Preferred audio wires 904 include copper wires which can also be surround by an insulating material 906 such as nylon silk. Using the teachings herein one can manufacture a zipper earphone cable assembly 700 that withstands at least up to 15 kg of torque from end to end (earbud 10*a* to jack 90).

Figures 13, 14:
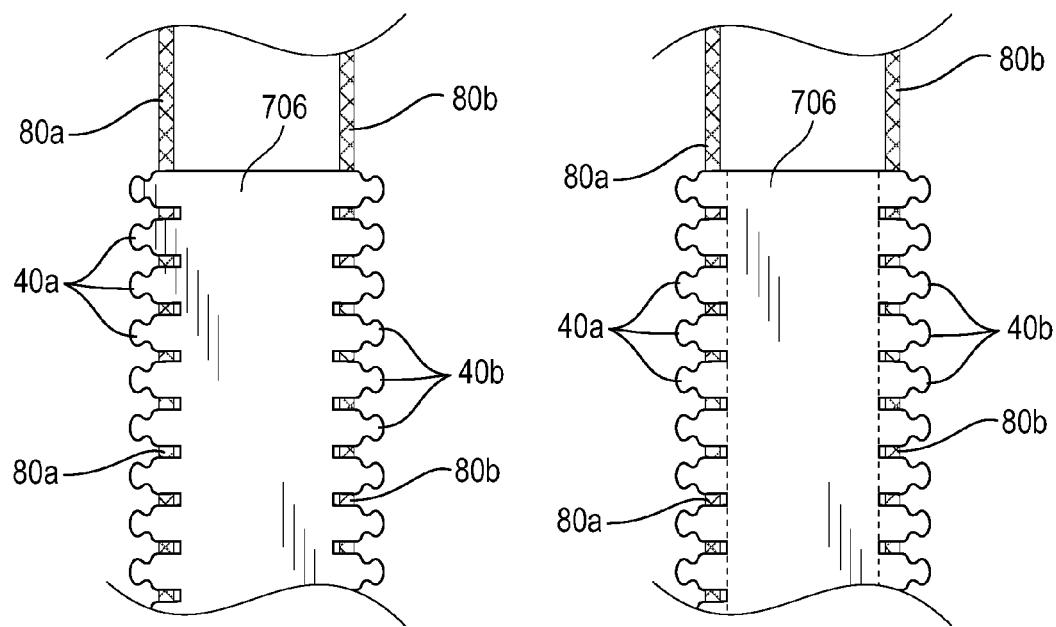
FIG. 13 is a topside view of a zipper teeth being injected molded onto the two cables and excess molding.
FIG. 14 is a topside view of the excess molding being cut away from the zipper teeth.
Figure 15:
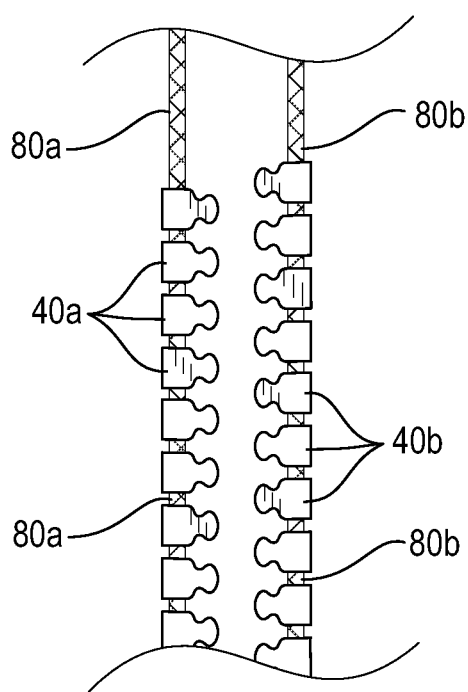
FIG. 15 is a topside view showing the zipper teeth being rotated 180 degrees.
Figure 16:
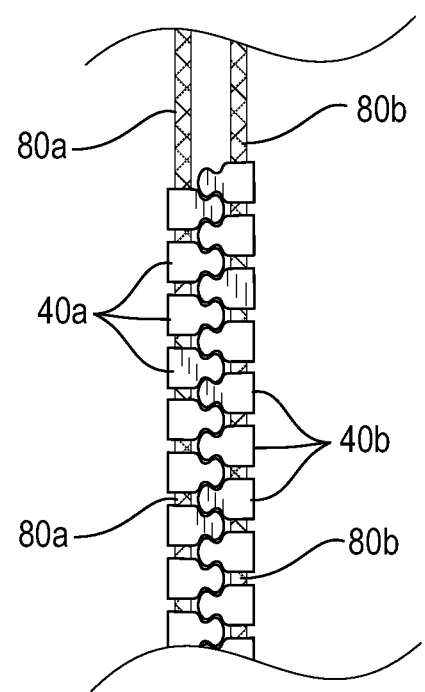
FIG. 16 is a topside view showing the zipper teeth zippered together.
Figure 18:
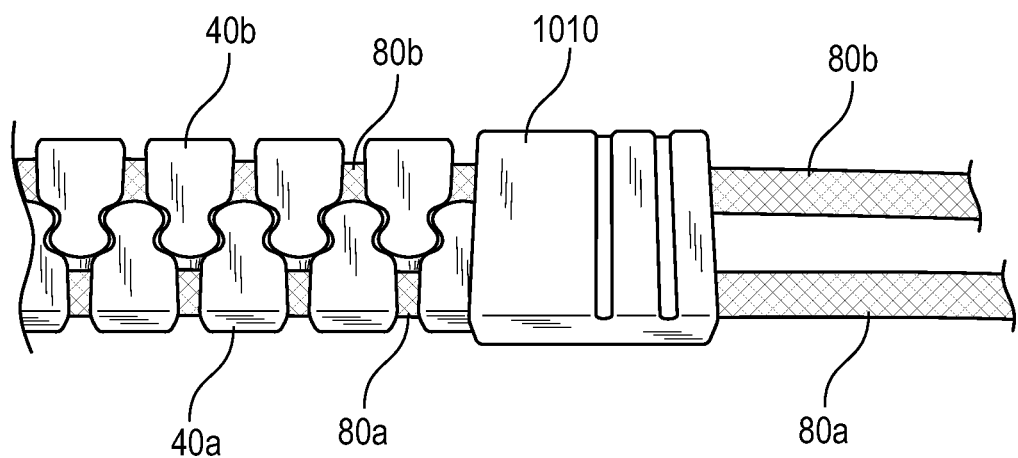
FIG. 18 shows a zipper bottom being placed below a zipper unit.

Once positioned as desired in the mold 702 the heated liquid material is allowed into the mold 702 such that it surround the cables 80*a* and 80*b* and fills the teeth shaped cavities 704*a* and 704*b*. After being allowed to set, the resulting assembly as shown in FIG. 13 can include an excess mold material 706 that is attached to the zipper teeth 40*a* and 40*b* bound to their respective cables 80*a* and 80*b*. As shown in this embodiment, the zipper teeth 40*a* and 40*b* face outwards, away from each other, after the injection molding material has hardened. This excess mold material 706 is sacrificial and can be removed using cutting tooling or by cutting by hand. This step is shown in FIG. 14. After the sacrificial molding 706 is removed, the remaining zipper teeth 40*a* and 40*b* are no longer connected to each other and are set on their respective cables 80*a* and 80*b*. As shown in FIG. 15, the zipper teeth 40*a* and 40*b* can easily be rotated 180 degrees such that they face each other to zip together (FIG. 16) and apart using a zipper slider 50 that is attached. In other embodiments the cavities of the zipper teeth can face each other in the mold and any excess molding can likewise be cut off. After installing the slider 50 onto the teeth 40*a* and 40*b* using any suitable method, two upper stops can be placed at the top of the rows of teeth 40*a* and 40*b* to prevent the slider 50 from sliding off the top. As shown in FIG. 18, a stop 1010 can also be placed at the bottom of the two sets of teeth 40*a* and 40*b* and be configured to prevent the zipper slider 50 from sliding off the bottom of the teeth. A decorative cover can be placed on the bottom stop 1010 if desired.

Figure 17:
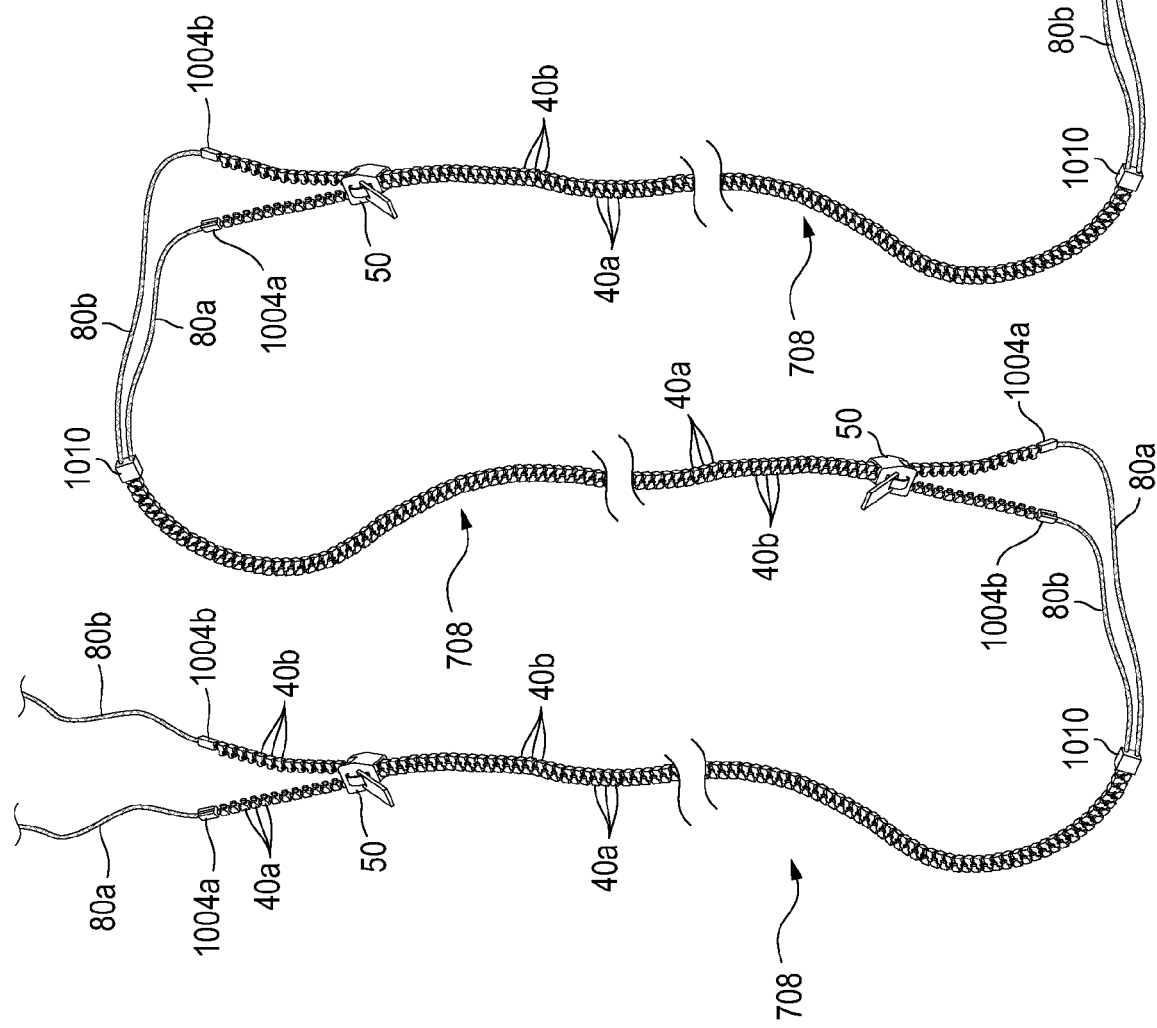
FIG. 17 is a perspective view of multiple zipper teeth unit having been injection molded onto the same two cables.

As shown in FIG. 17 it is preferred that multiple zipper units 708 are set onto the same two cables 80*a* and 80*b* through the use of mass production using an assembly line of workers and/or tooling. More specifically, spools of cable 80*a* and 80*b* can be configured to run through the manufacturing steps described above. Sufficient cable spacing should be provided for between the zipper units 708 to allow for attachment of the headphones, such as ear buds 10*a* and 10*b*, and a jack 90. Once the zipper unit 708 has been completed, the cables 80*a* and 80*b* can be cut at the desired length and additional parts such as the ear buds 10*a* and 10*b*, volume control 1000, and jack 90 can be installed using any suitable method of manufacturing.

In addition to standing alone, the zipper earphone assemblies herein can alternatively also be utilized directly with a clothing article, such as on a zip-up jacket or sweatshirt. The zippered cabled assembly can be manufactured according to the teachings described herein and then attached to the clothing article by sewing or other fastening means including hook and loop fasteners, clips, snaps, and the like. Preferably the audio jack can either be exposed at the bottom of the zipper or be positioned within a pocket of the clothing article such that a user can attach it to a portable audio player. According to one embodiment both cables of a headphone assembly have zipper teeth attached to them according to the teachings herein and define a zipper of an article of clothing, such as a jacket or sweatshirt.

Preferably water resistant, heat resistant, and durable ear buds and other parts are utilized to protect against the water from a clothes washer and the heat from a clothes dryer. Water proof ear buds are known in the art and can readily be used with this embodiment. According to certain embodiments, thermo-resistant thermoplastics such as POM or polycarbonate (pc) and the like can be used for the casing, while a hydrophobic mesh or membrane can be used for the venting. Additionally a high temperature resistant material such as polyetherimide (PEI), polyether ether ketone (PEEK) Polyethylene terephthalate (PET) can be used as a diaphragm material.

In certain non-preferred embodiments, the ear buds can be only water proof and the clothing article can include instructions not to machine dry, for example. Thus a user could wash their clothing article with the incorporated water proof ear buds and then hang it out to dry as opposed to subjecting it to the heat associated with a clothes dryer.

Figure 8:
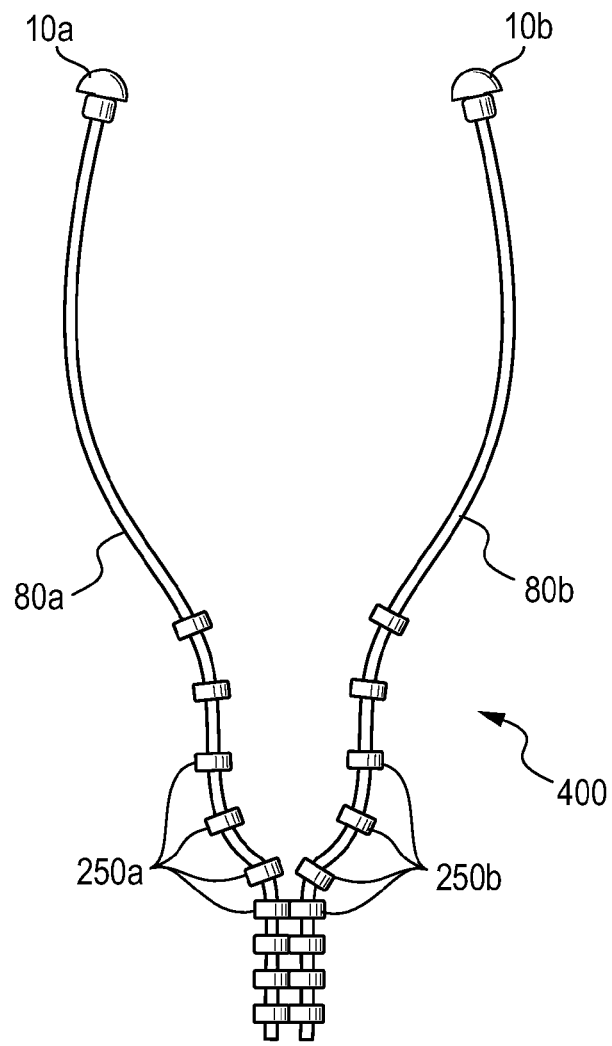
FIG. 8 is a perspective view of an earphone cable assembly that utilizes magnets as a releasable fastener.

An additional non-zippered cable assembly 400, such as shown in FIG. 8, is directed to the use of multiple small complementary magnets 250*a* and 250*b* spaced in intervals along the cables 80*a* and 80*b* that can allow the cables 80*a* and 80*b* to connect with each other and release. Magnets 250*a* and 250*b* can be incorporated into an over-mold material 60*a* and 60*b* such that they extend out from the molding, positioned outside the over-mold material 60*a* and 60*b* or be used directly on the cables themselves.

Expandable Cable Management Systems

According to additional embodiments, the cable management systems herein are not necessarily used with earphone wires and can be used to prevent entanglement of additional type of cables. FIGS. 6*a*, 6*b*, 7*a*, 7*b*, and 7*c* depict cable management systems that can compress and lengthen two or more wires. These assemblies are useful to prevent entanglement of speaker wires, A/V wires, gaming wires, computer wires, and the like. These assemblies can also be used to baby-proof household wires and to otherwise prevent general disorganization of wires.

FIGS. 6*a* and 6*b* depict a cable management assembly 500 that can expand to twice its compressed length, or substantially so. FIG. 6*a* shows the assembly 500 in a compressed state and having two internal channels 540*a* and 540*b* each configured to hold at least 1 wire 510*a* and 510*b*. Alternatively, the assembly can include 1, 2, 3, 4, 5, or more channels wherein each is configured to house at least 1, 2, 3, 4, 5, or more wires. A track 550 having means for releasable attachment can divide the two halves of the assembly 500. As one embodiment a zipper track can be used that can be opened and closed via zipper tab 50. Alternatively light magnets, or other releasable means can be used to divide the two halves of the assembly 500. The assembly is preferably made of a flexible material such as rubber or fabric, such that the two halves can be folded upon each other and releasably couple. FIG. 6*b* depicts the assembly 500 in an expanded, longer configuration. When the means for releasable attachment are released (e.g., the zipper track is unzipped) the assembly 500 is allowed to straighten out to be twice as long as the compressed configuration.

Figure 7A:
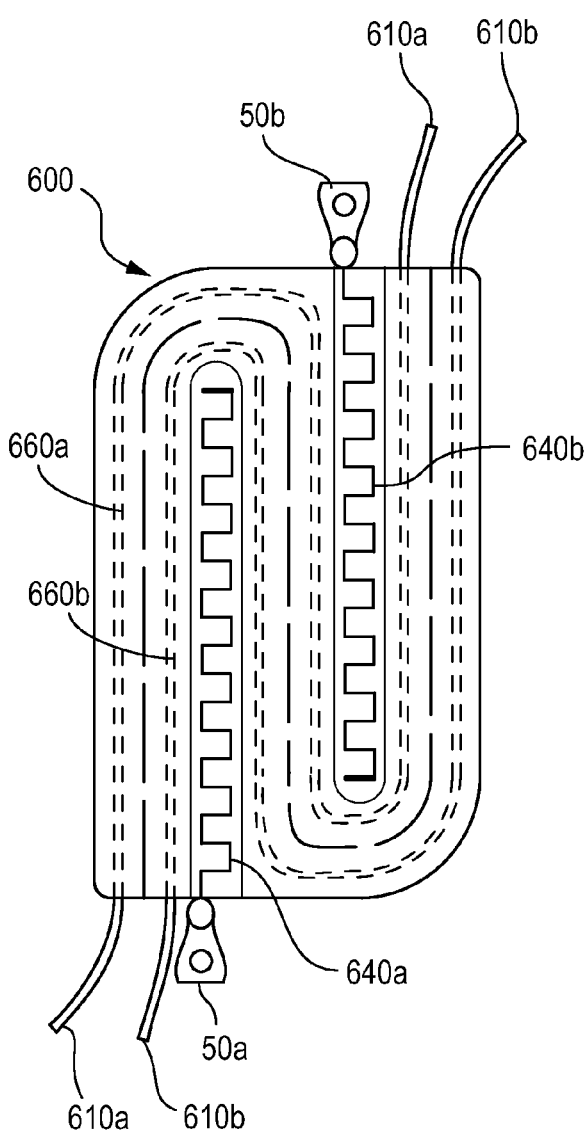
FIG. 7a is a closed cable assembly that can open to three times its length.
Figure 7B:
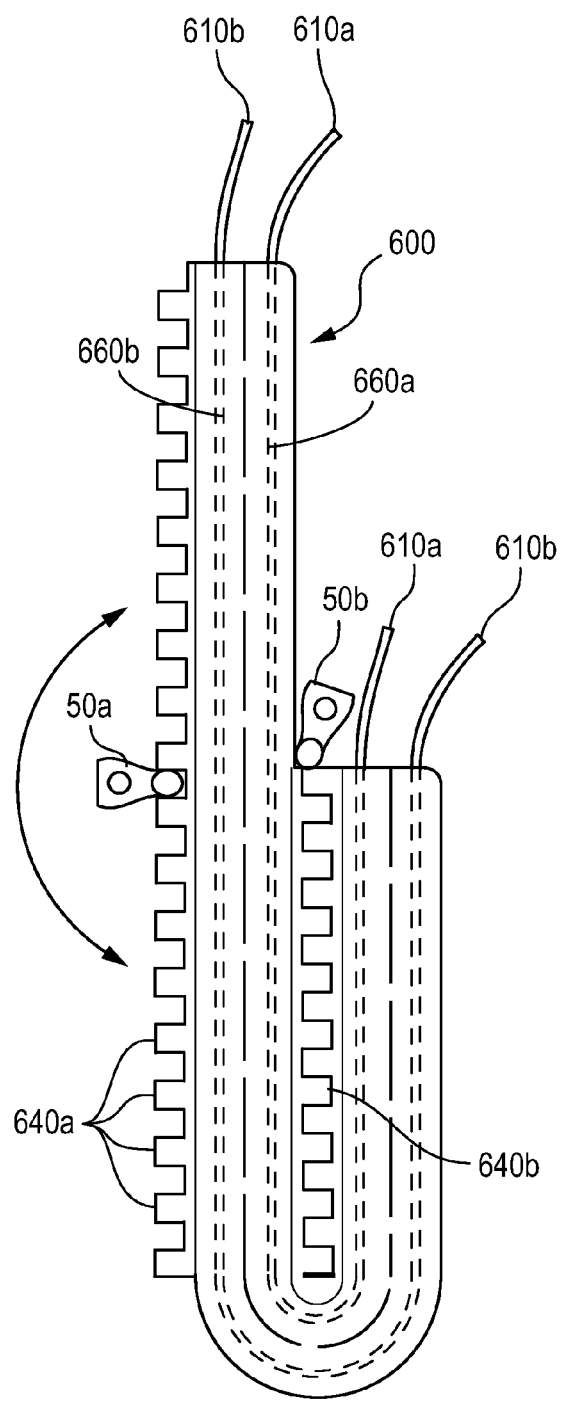
FIG. 7b is a partially opened cable assembly
Figure 7C:
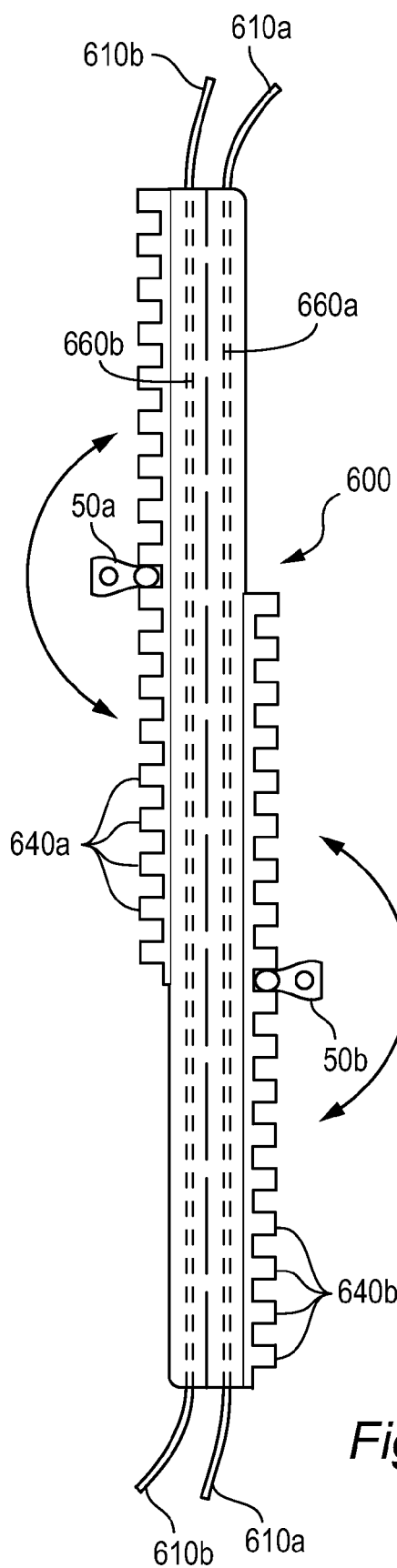
FIG. 7c is a fully opened cable assembly that is expanded to three times the length of its closed configuration.

Similarly FIGS. 7*a*, 7*b*, and 7*c* depict a cable management assembly 600 that can expand to 3 times its size from a compressed form. FIG. 7*a* depicts a compressed assembly 600 separated into 3 similarly or equally sized sections wherein each section is divided by a track 640*a* and 640*b* having means for releasable attachment. More specifically the first track 640*a* divides the first and second sections, while the second track 640*b* divides the second and third sections of the assembly 600. As one embodiment zipper tracks can be used for the tracks 640*a* and 640*b* and can be opened and closed via zipper tabs 50*a* and 50*b*. Alternatively light magnets, or other releasable means can be used to divide the three sections of the assembly 600. The assembly 600 includes two internal channels 660*a* and 660*b* each configured to hold at least 1 wire 610*a* and 610*b*. Alternatively, the assembly 600 can include 1, 2, 3, 4, 5, or more channels wherein each is configured to house at least 1, 2, 3, 4, 5, or more wires. The assembly 600 is preferably made of a flexible material such rubber or fabric, such that the three sections can be folded upon each other as shown in FIGS. 7a and 7b and be releasably coupled. FIG. 7b depicts the assembly 600 in a semi-expanded configuration, where the first section is released from the second section (track 640a is released), but the second section remains coupled to the third section (track 640b is closed). FIG. 7c depicts the assembly 600 in a fully expanded configuration that is opened when the second track 640b is opened (e.g., unzipped). The fully expanded configuration shown in FIG. 7c is 3 times the length of the compressed configuration FIG. 7a, or substantially so. The principals described above for assemblies 500 and 600 can be expanded to make even higher compressed cable management assemblies such as those that can be expanded to 4×, 5×, 6×, 7×, 8×, 9×, and 10× their compressed length. These assemblies can also include side ribs to increase their flexibility.

Additional embodiments are directed to using fabric having 1 or more channels as an outer layer to cover the two or more wires for certain embodiments above. Fabric is a preferred choice for certain designs in that it is very light weight and highly flexible. More specifically a zipper backing material, such as AQUAGUARD® manufactured by YKK® can be used to cover and manage wires utilizing the above embodiments, depending on the desired properties of the cable management assembly. This embodiment makes it easier to incorporate a zipper as a means for releasable attachment between the two cables.

The invention may be embodied in other specific forms besides and beyond those described herein. The foregoing embodiments are therefore to be considered in all respects illustrative rather than limiting, and the scope of the invention is defined and limited only by the appended claims and their equivalents, rather than by the foregoing description.

What is claimed is:

1. A cable assembly comprising:
a first electrical wire;
a second electrical wire; a thermo-resistant material that is molded around the first electrical wire and around the second electrical wire;
zipper teeth that are molded to the thermo-resistant material of the first electrical wire and the second electrical wire;
the zipper teeth molded to the first electrical wire being releasably attached to the zipper teeth molded to the second electrical wire; and
at least one reinforcing fiber, the at least one reinforcing fiber being encapsulated with at least one of the first electrical wire and the second electrical wire.

2. The cable assembly of claim 1, wherein:
the zipper teeth are created by injection molding; and
the cable assembly is a headphone assembly and the first and second wires are configured to transmit audio sound from a jack to headphones.

3. The cable assembly of claim 1, wherein an outer surface of the first electrical wire and the second electrical wire comprise at least one of draw textured yarn and braided nylon.

4. The cable assembly of claim 1, wherein the zipper-teeth are thermoplastic.

5. The cable assembly of claim 1, wherein the at least one reinforcement fiber comprises an aramid.

6. The cable assembly of claim 1, wherein the at least one reinforcement fiber comprises Kevlar.

7. The cable assembly of claim 2, wherein the cable assembly can withstand up to 15 kg of torque from the jack to the headphones.

8. The cable assembly of claim 1, wherein the cable assembly further includes a stop to help stop a zipper slider from sliding off the bottom of the zipper teeth, wherein the stop is attached to the first electrical wire and the second electrical wire.

9. A method of making a cable assembly comprising:
providing a first electrical wire and a second electrical wire that are individually encapsulated by injection molding, an outer layer comprising a thermo-resistant material outside the first electrical wire and the second electrical wire;
an affixing apparatus for releasable attachment on the outer layers of the first electrical wire and the second electrical wire, such that the outer layers can releasably attach with one another; and
one or more reinforcement fibers positioned within the injection molding individually encapsulating the first electrical wire and the second electrical wire.

10. The method of claim 9, wherein the cable assembly is a headphone assembly and the first and second wires are configured to transmit audio sound from a jack to headphones.

11. The method of claim 10, wherein the thermo-resistant material comprises at least one of draw textured yarn and braided nylon.

12. The method of claim 10, wherein the cable assembly can withstand up to 15 kg of torque from the jack to the headphones.

13. The method of claim 10, wherein a volume control is attached to at least one of the first electrical wire and the second electrical wire.

14. The method of claim 9, wherein the affixing apparatus comprises a thermoplastic zipper.

15. The method of claim 14, wherein a stop used to stop a zipper slider from sliding off the bottom of the zipper, wherein the stop is attached to both the first and second electrical wires.

16. The method of claim 9, wherein the first and second wires are individually encapsulated in an inner layer having thermo-resistant and elastomeric properties positioned underneath the outer layer.

17. The method of claim 9, wherein the one or more reinforcement fibers comprise at least one of an aramid and Kevlar.

18. A cable assembly comprising:
a first electrical wire;
a second electrical wire;
a thermo-resistant material that is molded around the first electrical wire and around the second electrical wire;
zipper teeth that are molded to the thermo-resistant material of the first electrical wire and the second electrical wire;
the zipper teeth molded to the first electrical wire being releasably attached to the zipper teeth molded to the second electrical wire via a zipper slider;
at least two reinforcing fibers comprising a first reinforcing fiber and a second reinforcing fiber, the first reinforcing fiber being encapsulated with the first electrical wire, the second reinforcing fiber being encapsulated with the second electrical wire; and
a stop used to stop the zipper slider from sliding off a bottom of the zipper teeth, the stop being attached to the first electrical wire and the second electrical wire, wherein the cable assembly is a headphone assembly, and the first electrical wire and the second electrical wire are configured to transmit audio sound from a jack to headphones.

19. The cable assembly of claim 18, further comprising a volume control attached to at least one of the first electrical wire and the second electrical wire.

* * * * *